UNITED STATES PATENT OFFICE.

JAMES O. WALSH, OF NEW YORK, N. Y., AND ARTHUR C. AUSTIN, OF HASBROUCK HEIGHTS, NEW JERSEY, ASSIGNORS TO SAID WALSH, OF NEW YORK, N. Y.

METHOD OF PREPARING A FOOD PRODUCT.

1,090,256.     Specification of Letters Patent.     Patented Mar. 17, 1914.

No Drawing.     Application filed March 12, 1913. Serial No. 753,657.

*To all whom it may concern:*

Be it known that we, JAMES O. WALSH, of the city, county, and State of New York, and ARTHUR C. AUSTIN, of Hasbrouck Heights, Bergen county, New Jersey, have invented a new and useful Improvement in Methods of Preparing a Food Product, of which the following is a full, clear, and exact description.

Our invention relates to an improved method of preparing a food product in which bananas are used as the base.

The object of our invention is generally to produce a wholesome, easily digestible, and palatable food product, which can be eaten with cream or other sauces. More specifically, the object of our invention is to produce a method by which the bananas can be incorporated with a digestible absorbent which will leave the ultimate product with a rich banana flavor, and in which the product can be served in a wholesome and acceptable manner, and will be thoroughly dry and clean so that it can be handled without difficulty and without danger of accumulating foreign matter because of its stickiness.

In carrying out our invention, we take a quantity of ripe raw bananas, which are first peeled, and the pulp is thoroughly mingled with an equal portion by weight of some digestible absorbent which will take up the juices of the bananas. Ground rice is found to be the most suitable absorbent, because its absorbent qualities are great, and its characteristics are such that it blends with the banana pulp without impairing the banana taste. An absorbent which has a strong taste of its own would not be so acceptable, but other absorbing materials can be used such as the flour of other grains. This mingling operation is preferably performed by kneading the materials together, and while they are being kneaded, a quantity of pure banana extract or flavoring is added to the mass. This compensates for the addition of the absorbent, and moreover, some of the flavor is lost in the steaming operation which follows, and the addition of the flavoring extract leaves the finished product with the natural banana taste. The dough thus formed is put into a suitable vessel and steam cooked for about thirty minutes. After this the mass is put into a vat where it is steamed and subjected to a heavy pounding until the mass becomes perfectly smooth and very glutinous. The cooking and pounding may be performed at the same time, if preferred, and the pounding is accomplished in a manner analogous to pounding materials in a mortar with a pestle. This produces an absolutely homogeneous and thoroughly incorporated mass.

After the above operation, the mass is removed from the vat and laid out in lumps or piles to temper in the air, and is allowed to lie in this condition for about forty-eight hours. The object of tempering in the air is to permit the surplus moisture to pass off, and the mass thus acquires a condition where it can be cut up without sticking to the knife. It thus comes into a condition where it has about the consistency of cheese, and it is cut into slices or cubes or blocks. If cut into blocks, these are thoroughly dried, and become exceedingly hard. They are then placed in a very hot oven for a period of approximately three minutes, and when heat is applied, they puff up to about twice the original size, and are ready to serve. When the doughy mass has been beaten as described, quite a quantity of atmospheric air is worked into it, and the beating makes the material more glutinous and sticky so that the air cannot wholly escape. Consequently when the particles are heated, the air expands in the particles and puffs them up. After being heated and puffed as described, the particles or granules become very light, frangible, and also absorbent, so that they will readily combine with cream or other sauces served with them.

If the tempered mass is cut into slices, the slices can be run through steel or other rollers to thin them out to about the thickness of tissue paper, and they are then allowed to dry for an hour or more, becoming very brittle and hard, after which they are subjected to intense heat for about thirty seconds, which gives them the form of crisp flakes, ready to serve, and like the puffed blocks above referred to, capable of readily assimilating with a suitable sauce.

The product when produced as above and when ready to serve, is a dry, clean, non-sticky product having a full, rich banana flavor, and it can be readily handled and easily served. In combining a digestible absorbent with the banana pulp, ground rice is preferred as stated, but in any event care should be taken to use an absorbing material which does not have a strong natural flavor of its own, as otherwise the banana flavor may be impaired.

We claim:—

1. The herein described method of preparing a food product, which consists in thoroughly mingling banana pulp and a digestible absorbent, next kneading the mingled materials, next cooking the mingled ingredients and thoroughly incorporating them while being cooked, next tempering in the air the cooked mass, then dividing the mass into smaller particles, and finally subjecting the divided particles to a high temperature.

2. The herein described method of preparing a food product, which consists in mingling banana pulp with ground rice, next steaming, pounding, kneading and thoroughly mingling the mass, next steaming and further incorporating the parts together, then laying out the cooked mass to temper in the open air, then dividing the mass into smaller parts, next drying these parts, and finally subjecting the divided parts to a high temperature.

3. The herein described method of preparing a food product, which consists in mingling banana pulp with a digestible absorbent, adding to the mixed parts an excess of banana flavoring, then steam cooking and pounding the mass to render it smooth and glutinous, next laying the mass out in bulk to temper in the air, then dividing the tempered mass into relatively small parts, drying these parts, and finally subjecting the divided parts to a high temperature.

4. The herein described method of preparing a food product, which consists in mingling together banana pulp and a digestible absorbent which will take up the juices of the banana pulp, kneading the mingled ingredients and adding an excess of banana flavor, next steaming and pounding the mingled mass, then laying out the cooked mass in bulk to temper in the air, next dividing the tempered mass into relatively small parts, drying these parts, and then subjecting the divided parts to a high temperature.

5. The herein described method of preparing a food product, which consists in mingling together banana pulp and a digestible absorbent which will take up the juices of the pulp, steaming and pounding the mass, dividing the mass into relatively small parts, drying these divided parts, and finally subjecting the divided parts to a high temperature.

JAMES O. WALSH.
ARTHUR C. AUSTIN.

Witnesses:
WARREN B. HUTCHINSON,
M. G. O'DONNELL.